April 17, 1934.  J. J. BRIGHT ET AL  1,954,787
MOVING PICTURE CABINET ENLARGING DEVICE
Filed Feb. 12, 1931

INVENTORS.
JAMES J. BRIGHT.
DUDLEY P. LEE.
BY
Lockwood Lockwood Goldsmith & Gast
ATTORNEYS.

Patented Apr. 17, 1934

1,954,787

UNITED STATES PATENT OFFICE 1,954,787

MOVING PICTURE CABINET ENLARGING DEVICE

James J. Bright and Dudley P. Lee, Indianapolis, Ind.

Application February 12, 1931, Serial No. 515,170

1 Claim. (Cl. 88—24)

This invention relates to a compact, unitary arrangement for the formation of images.

The chief object of this invention is to provide means associated with a screen and an image producer, such as a moving picture projection machine and the like, and so associate the same together that the stray light will be kept from the observer and that the image producer and the screen may be closely associated together, which object is obtained by the employment of an enlarging mirror system and confining the same within a cabinet.

The chief feature of the invention consists in the provision of a cabinet having a translucent screen occupying a considerable portion of the cabinet face or front and upon which the image is formed as an enlargement of the initial image produced by the image producer, such as a moving picture projection machine and the employment of mirrors mounted within the cabinet and operatively associated with the screen and the image producer for the accomplishment of the object before mentioned.

Other features of the invention will appear more fully from the description set forth hereinafter.

The full nature of the invention will be understood from the accompanying drawing and the following description and claim:—

In the drawing, Fig. 1 is a perspective view of one embodiment of the invention showing the screen for image production.

Figure 1:
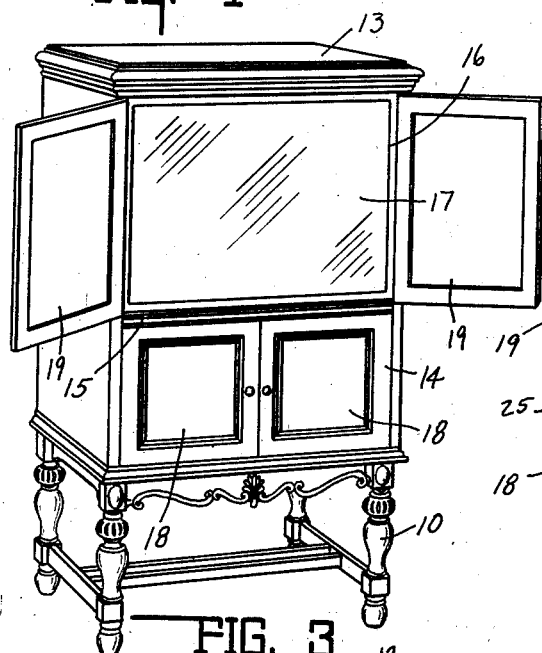

In the drawing, 10 indicates the base of a cabinet having the bottom 11, the back 12, the top 13 and the front 14 having a large opening therein which is divided by the rail 15 into upper and lower portions. The upper portion or opening 16 is closed by a suitable translucent screen 17. The lower portion of the front is closed by a pair of doors 18. The upper portion or screen may be completely enclosed by a pair of doors 19. These doors are herein shown hingedly mounted but they may be otherwise mounted to permit access to the interior of the cabinet or to expose the screen when desired.

Mounted on the base 11 is a pair of spaced angle shaped rails, or guide retainers, 20 which slidably support the plate or platform 21 which in turn supports a pair of groove forming arcuate members 22. A circular disc 23 is rotatably supported in said arcuate grooves thus formed and supports the base 24 of an image producer, such as the domestic, portable household type moving picture projector, indicated generally by the numeral 25. The disc 23 supports a pivotally mounted handle 123 by which the plate may be withdrawn from the guides and/or the disc may be rotated in the grooves whereby the projection machine may be conveniently exposed for oiling, film threading, adjustment and the like.

Figure 2:
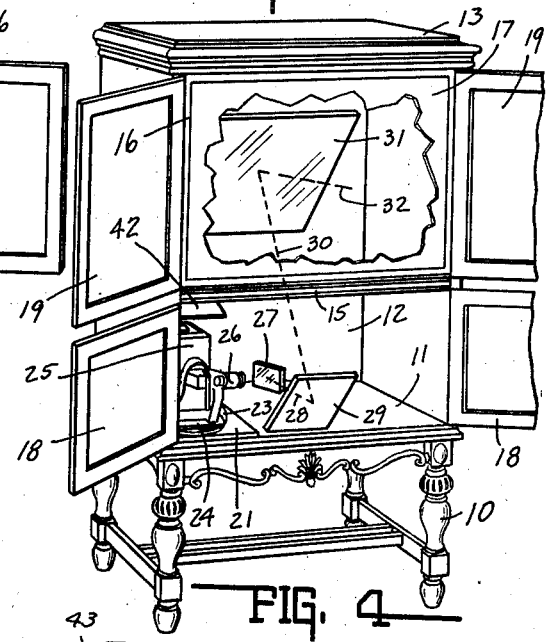
Fig. 2 is a similar view of the same with certain of the doors open to show the heat deflector, the mirror system, the image producer and its mounting within the cabinet, the screen being broken away to show a portion of the interior of the cabinet and a portion of one of the mirrors.
Figure 3:
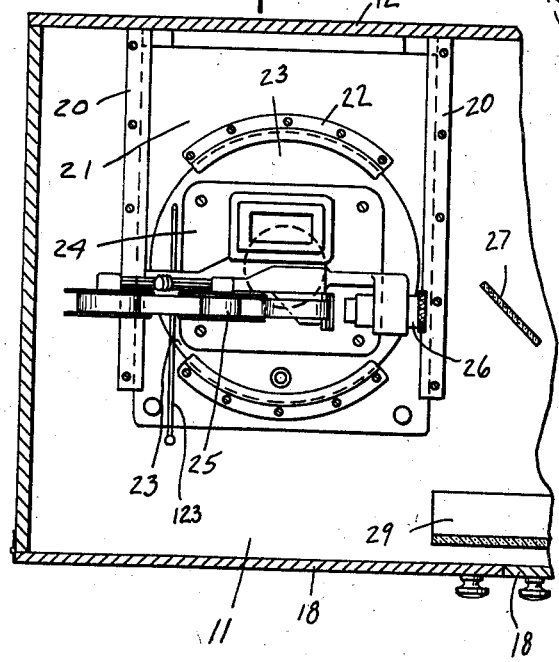
Fig. 3 is an enlarged, transverse, sectional view of the cabinet and a part of the mirror system and also illustrates in plan the image producer and its detachable mounting.
Figure 4:
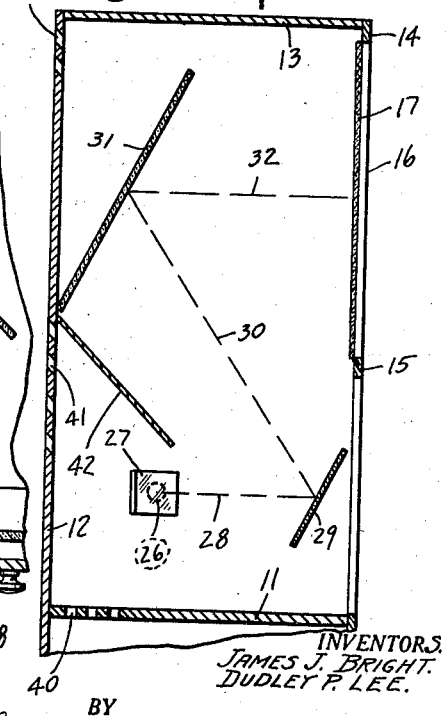
Fig. 4 is a vertical, sectional view through the cabinet and illustrates the mirror system associated with the screen.

Fixedly mounted within the lower portion of the cabinet and in predetermined relation to the projection lens arrangement, indicated generally by the numeral 26, is a mirror 27. The mirror 27 is set at exactly forty-five degrees to the axis of the lens system and the light rays falling upon the mirror are thrown forwardly, as indicated by the dotted line 28 in Figs. 2 and 4, and impinge upon the mirror 29 which is inclined to the horizontal at a suitable angle. The light ray 28 which engages substantially center of mirror 29 is reflected therefrom rearwardly and upwardly, as indicated by the line 30, and impinges upon the center of mirror 31, and said ray is reflected therefrom as indicated by the horizontal line 32 and passes through the center of the screen 17.

The mirrors 31 and 29 are parallel so that the light rays which are projected upon mirror 29 are reprojected from the mirror 31 in substantially parallel relationship but at greater spacing thereby appropriately enlarging the image.

By using an odd number of mirrors the image is reversed in transit and reversal of the film in a moving picture projector is not required.

In view of the predetermined fixed positioning of the mirrors, and screen and the definite location of the plate and disc, the lens of the projector does not require focusing for each successive set up or picture.

The results of this mirror system is that the clear cut but initially small image is reflected from mirror to mirror so that there is formed upon the screen 17 the perfect and enlarged image desired to be obtained from the image producer. The same is the equivalent of the positioning the image producer at a great distance in front of the screen if it were opaque or at an equal distance behind the screen if it were translucent. There is thus obtained an apparent shortening of the usual required distance between the screen and the image producer so far as the observer is concerned. The advantage of this apparent reduction in distance is that the moving picture machine can be employed in small apartments and in so-called demonstrating cubbyholes or compartments for those who commercially sell moving picture film and the like to the householder customer.

Another advantage of the present invention is that obtained by putting the camera behind the screen and projecting through the same, to wit, the exclusion of stray light from the eyes of the observer. This desirable quality object is not only obtained with the present invention, but in addition thereto, the same is obtained without the requirement of the relatively long distance heretofore required for such purposes.

For domestic or household purposes, it is impractical and undesirable to position the screen near one end of the room and have the observers or audience in the room backed up against the wall and then at the opposite end of the room have the projecting machine. The present invention permits the cabinet to be placed at one end of the room and observers may sit in the room at any desired position with reference thereto and view the screen with the image thereon from any such position without interference from stray light and without requiring a large intervening projector to screen distance in order to form the image of sufficient size to be readily viewable and satisfactory.

As heretofore suggested, positioning the screen against one wall and permitting the observers to sit in front of the screen at any desired position and positioning the image producer either in front of or behind the audience and throwing the light rays on to the screen has the inherent objection that stray light from the machine and stray light from the light rays forming a part of the image seriously interfere with the visual reception of the final image by the observer.

Another objection to such positioning is that the observers cannot freely move about the room or shift positions, because of possibility of crossing through the light rays forming the image. The present invention permits freedom of movement on the part of all of the observers, permits the image to be properly formed and of the desired size and reproduced on the screen in its desired clearness and sharpness, eliminates all stray light either from the machine itself or from the light rays forming the image and has the additional advantage of being not only arranged for compact reproduction, but the invention also has the advantage of being adaptable to a highly ornamental piece of furniture that is a source of pleasure and ornamentation in the home.

This invention also eliminates the use of long current supplying wires which heretofore have extended into the room and moving over which observers or the operator frequently tripped and sometimes damaged the projector, although such tripping usually threw the projector out of focus or the image off the screen.

Ordinary moving picture projection requires a suitable light source which, of course, generates heat. To dissipate said heat, the openings 40 may be provided in the base 11 and the current of air passing over the projector withdraws the heat therefrom and the light source and this heated air may pass out through the back and through the upwardly inclined opening 41 formed therein. To prevent the heat from passing upwardly and possibly clouding the mirror 31, a deflector 42 is provided which is so arranged that it will not interfere with the proper transmission of the light rays from mirror to mirror. Any slight amount of heated air which passes forwardly and upwardly may be vented through the openings 43 in the upper portion of the back 12.

It will be apparent that the angular relationship between line 28 and line 30 is identical with that between line 30 and 32. Inasmuch as a flat mirror system is employed, the angle of incidence equals the angle of reflection in each instance, so that the angle between each mirror and its line of impingement is equal to the angle made between each mirror and the line of reflection therefrom. To prevent "multiple" image effect the exposed face of the mirror constitutes the reflecting surface.

Since the initial formation of the image is of cone formation as it comes from the projector lens system 26, the cone formation is not transmitted as a cylinder but the mirror system continuously enlarges the original conical arrangement thereby obtaining optically the same effect as if the projector were positioned at a considerable distance, either in front or behind of the screen to obtain the same image formed thereon as has heretofore been the practice.

Positioning the projector in the cabinet also serves to confine the noise of the projector to cabinet, thereby providing quieter operation for the observer's convenience.

The invention claimed is:

In combination a cabinet including an exposed translucent screen for visualizing an image, an image producer within the cabinet, a system of angularly arranged reflecting mirrors for transferring the light rays from the producer to the back of the screen, and means adjustably mounting said image producer within the cabinet and arranged for movement of the producer for exposure, said means including a longitudinally slidable platform, a supporting disc and a pivotally supported handle connected to said disc, said disc being pivotally supported upon said platform and said platform and said disc having independent movement and arranged for simultaneous relative movement when the platform and the disc are simultaneously moved by the handle in the sliding of the platform.

JAMES J. BRIGHT.
DUDLEY P. LEE.